United States Patent

Vartiainen et al.

[11] Patent Number: 6,071,425
[45] Date of Patent: Jun. 6, 2000

[54] METHOD AND APPARATUS FOR WASHING THE FILTER FABRIC OF A FILTER PRESS

[75] Inventors: Timo Vartiainen, Saimaanharju; Esa Paavola, Lappeenranta, both of Finland

[73] Assignee: Larox Oy, Lappeenranta, Finland

[21] Appl. No.: 08/894,444

[22] PCT Filed: Feb. 19, 1996

[86] PCT No.: PCT/FI96/00093

§ 371 Date: Oct. 22, 1997

§ 102(e) Date: Oct. 22, 1997

[87] PCT Pub. No.: WO96/25994

PCT Pub. Date: Aug. 29, 1996

[30] Foreign Application Priority Data

Feb. 20, 1995 [FI] Finland ................................. 950765

[51] Int. Cl.⁷ ................................................ B01D 25/127
[52] U.S. Cl. ...................... 210/791; 210/797; 210/798; 210/225
[58] Field of Search .................................. 210/224, 225, 210/227, 230, 231, 391, 393, 396, 397, 400, 407, 408, 409, 410, 411, 791, 797, 798

[56] References Cited

U.S. PATENT DOCUMENTS

| | | | |
|---|---|---|---|
| 3,583,566 | 6/1971 | Meshengisser et al. | 210/225 |
| 3,613,563 | 10/1971 | Meshengisses et al. | 210/225 |
| 3,647,082 | 3/1972 | Ishigiki | 210/225 |
| 3,655,055 | 4/1972 | Van Egdom et al. | 210/225 |
| 3,690,462 | 9/1972 | Kurita | 210/225 |
| 3,695,440 | 10/1972 | Mori | 210/225 |
| 3,696,930 | 10/1972 | Tokura | 210/225 |
| 3,698,557 | 10/1972 | Ishigaki | 210/225 |
| 3,767,052 | 10/1973 | Shibasaki | 210/225 |
| 3,968,040 | 7/1976 | Ostrop | 210/225 |
| 4,346,003 | 8/1982 | Polyakov et al. | 210/225 |
| 5,573,667 | 11/1996 | Benesi | 210/400 |

FOREIGN PATENT DOCUMENTS

| | | |
|---|---|---|
| 51769 | 12/1977 | Finland . |
| 1 271 174 | 4/1972 | United Kingdom . |

*Primary Examiner*—Robert J. Popovics
*Attorney, Agent, or Firm*—Kubovcik & Kubovcik

[57] ABSTRACT

A method and apparatus for washing a filter fabric (3) of a filter press. The method includes filtering a material to be filtered containing a liquid and solids through the filter fabric (3) in a filter cell (20), retaining the solids on a surface of the filter fabric (3) thereby forming a filter cake (18) on the filter fabric (3), discharging the filter cake (18) from above the filter fabric (3) to one side of the filter press only, conveying an area of the filter fabric (3) soiled during the previous filtration step to a washing cell (21) for washing the soiled area of the filter fabric (3) and washing the soiled area of the filter fabric (3) in washing cell (21). A filter press apparatus includes at least one filter cell (20) for filtering a material to be filtered, a filter fabric (3) through which the material to be filtered is filtered in the at least one filter cell (20), and at least one washing cell (20) for washing an area of a filter fabric (3) after it has been soiled during filtration in the at least one filter cell (20); the at least one washing cell (21) being arranged to form, together with the at least one filter cell (20), a filter plate pack (1) and to receive a portion of said filter fabric (3) that has been soiled during filtration in said at least one filter cell (20) and including means to wash said soiled portion of said filter fabric (3).

16 Claims, 2 Drawing Sheets

I — I

II — II

METHOD AND APPARATUS FOR WASHING THE FILTER FABRIC OF A FILTER PRESS

BACKGROUND OF THE INVENTION

1. Field of the Invention

The present invention relates to a method for washing the filter fabric of a filter press, said method comprising a filtration sequence in which the material being filtered such as a slurry is taken to a filter cell, whereby the solids suspended in the slurry remain on the surface of the filter fabric thus forming a filter cake while the liquid vehicle of the slurry is passed as the filtrate through the filter fabric.

2. Description of the Related Art

Automatic filter presses are widely employed in the mining and process industries for filtering slurries, whereby the suspended solids are separated from the liquid.

Typically, an automated filter press comprises a filter pack formed by a plurality of identical stacked filter plates performing a parallel function in the filter press. Between the filter plates is adapted in a zig-zag fashion meandering a long, endless filter fabric belt or similar filter medium on which the solids particles accumulate during filtration thus forming a filter cake. On the upper surface of the filter plate is provided a grating, a grooved pattern or similar recessed structure that supports the overlying filter fabric, however, simultaneously permitting the filtrate, which is formed in the filtration process by permeation through the fabric, to discharge from the interior of the filter plate. To the lower surface of the filter plate is arranged an almost constant-height cell with an area covering almost the entire plate and sealed at its edges, into which cell the slurry to be filtered is fed by pumping. The upper part of the cell is generally provided with an elastic compression membrane made of rubber, for instance, whereby a pressurized medium (water, air, etc.) applied above the membrane permits compression of the formed filter cake for dewatering the cake.

In the beginning of the filtration sequence performed using such a filter press, a closing device first pushes the filter plates pressure-tightly against each other to secure the plate pack between compressive end plates, whereby filter cells are formed in the stacked filter plate pack. Next, into each filter cell is pumped the slurry to be filtered, whereby the solids suspended in the slurry remain on the surface of the filter fabric thus forming a filter cake while the liquid filtrate is drained away through the filter fabric.

After the slurry infeed step, above said elastic compression membrane is applied a pressurized medium causing the membrane to exert mechanical compression on the filter cake thereby reducing its moisture content. At the completion of the compression step, the applied pressure is released and compressed air or similar gaseous medium is passed through the filter cake in order to reduce its moisture content. When required, the filter cake may further be subjected to washing using at least one washing fluid passed through the cake.

After the completion of the filtration steps, the closing device opens the filter plate pack, whereby the filter plates remain hanging by their hanging lugs at a distance from each other. The filter cakes are removed to opposite sides of the filter press when the endless filter fabric belt adapted to pass between the filter plates is actuated to move with the help of a conveyor means of the filter fabric. During the motion of the filter fabric belt, the fabric is conventionally washed with the help of washing spray nozzles placed into a stationary position.

As the filter fabric which forms a long, endless belt is moved during the filter cake discharge step, the filter cakes are dropped from both ends of the filter plate pack into cake discharge hoppers, and therefrom, further onto a belt conveyor or similar device placed under the filter frame. If such a belt conveyor can be adapted parallel to the filter plates, the arrangement based on two discharge points operates without problems. However, in some cases (e.g., when the belt conveyor cannot be adapted parallel to the filter plates) it may be advantageous to have the discharge of all filter cakes arranged to occur at a single point.

In conjunction with the filtration of certain types of slurries, washing the continuously moving filter fabric at one stationary point only may be ineffective. Particularly when filtering slurries that tend to plug the filter fabric rapidly, it would be advantageous to have the filter fabric washed after each filtration step. Obviously, this could be implemented also in conventional filter constructions provided that the filter fabric is moved through its full length after each filtration step. However, due to the appreciable length of the filter fabric belt, this would take a long time in regard to the duration of the actual filtration step, resulting in a significant reduction of filtration capacity in the filter.

SUMMARY OF THE INVENTION

It is an object of the present invention to achieve a filter plate pack construction capable of overcoming the disadvantages of the above-described techniques and particularly providing effective washing of the filter fabric concurrently with the filtration step. The characteristic properties of the invention are disclosed in the appended claims. It is a further object of the invention to provide a filter plate construction for a filter press that makes it possible to perform the washing step of the filter medium during the actual filtration step and to adapt the discharge of filter cakes to one side of the filter press only.

For its filtering section, the filter plate pack according to the invention is comprised of two cell types providing essentially different functions.

More specifically, the filter apparatus construction according to the invention has every second filter cell serving as the filtering cell proper, whereby the filter cell is limited by the elastic compression membrane from its one side and by the filter fabric supported by the to grating from its other side.

In detail, every other second cell is a so-called washing cell, which is most appropriately limited from its one side by the filter fabric supported by an essentially open structure such as a grating in a similar fashion as the filtering cell proper. On its other side the washing cell is limited by, e.g., a solid wall or an essentially open structure such as a grating supported by a solid wall. The height of the washing cell can be made small, because the liquid fed into it does not contain significant amounts of solids. The essential function of the washing cell is to provide passage through the fabric for the liquid pumped into the cell. The number of the washing cells in the filter press is advantageously 1–12, most advantageously 4–10. The cells are designed to open at interplate gaps holding the filter fabric in the same fashion as in a filter press equipped with a conventional filter plate pack.

A typical filtration sequence in the filter press equipped with the filter plate pack according to the invention is started by the closing of the filter plate pack, whereby the filter fabric remains folded in a zig-zag fashion through the gaps formed between the filter plates, thus forming the cells of above-described essentially different functions.

The slurry to be filtered is fed by pumping into the filter cells of the filter plate pack, whereby the liquid will be drained through the filter fabric and discharged out from the filter press while the solids particles remain on the surface of the fabric forming a filter cake. Simultaneously, water or the like washing fluid can be pumped into the washing cells for washing that portion of the filter fabric which became loaded with solids during the previous filtration step.

Besides, the washing step imposed on the fabric in the washing cells can be extended over the other process steps (that is, compression with the membrane, possible filter cake washing, filter cake dewatering with air) if so required. Additionally, the washing step can be performed as a dissolving washing step, whereby foreign matter adhering to the fabric is dissolved in the washing fluid.

Since the filter cells may be brought to a pressure of greater than 10 bar during the different steps of the filtration process, bending of the filter plates under the feed pressure must be prevented by bringing the washing cells to an equivalent pressure or using mechanical reinforcements. Arranging such a compensating pressure into the washing cell may be difficult, because in practice the internal pressures in the filter cells vary during the different steps of the filtration process. Hence, it may be more preferable to limit the bending of the filter plates by mechanical means through placing a support such as a grating or similar structure to both sides of the filter fabric section remaining inside the washing cell, whereby the support structure permits the passage of the washing fluid practically through the entire area of the fabric, simultaneously preventing the bending of the filter plates. Subsequent to the completion of the filtration steps, the washing fluid is removed from the washing cells by, e.g., passing compressed air into the washing cells, after which the filter plate pack is opened for the discharge of the filter cakes.

While the filter cakes are discharged from the filter press by the movement of the continuous filter fabric belt to both sides of the filter frame in a conventional filter plate construction, the apparatus construction according to the present invention makes it possible to discharge the cakes to one side of the filter press only. Hence, the filter press according to the invention permits washing the filter fabric simultaneously with the on-going filtration step. Resultingly, the fabric need be moved only by the distance shifting it from one interplate gap to the next, whereby the duration of the cake discharge step becomes very short with respect to the time required in a conventional filter press construction. The washing fluid flow is adapted to occur countercurrently to the flow direction of the filtrate through the fabric during the filtration step, thus achieving effective backwash of solids particles that have become lodged in the weave of the fabric. As the filter cake formation and backwash of the fabric occur alternatingly on each individual area of the fabric belt, the fabric will never reach a state of deep plugging. The backwash step may also be carried out as a dissolving wash using a suitable chemical, whereby the washing cell is first filled with the chemical washing fluid that then is allowed to dissolve the solids particles lodged in the weave of the fabric.

BRIEF DESCRIPTION OF THE DRAWINGS

In the following, the invention will be described in greater detail by means of an exemplifying embodiment with reference to the annexed drawings in which.

DETAILED DESCRIPTION OF THE INVENTION

Figure 1:
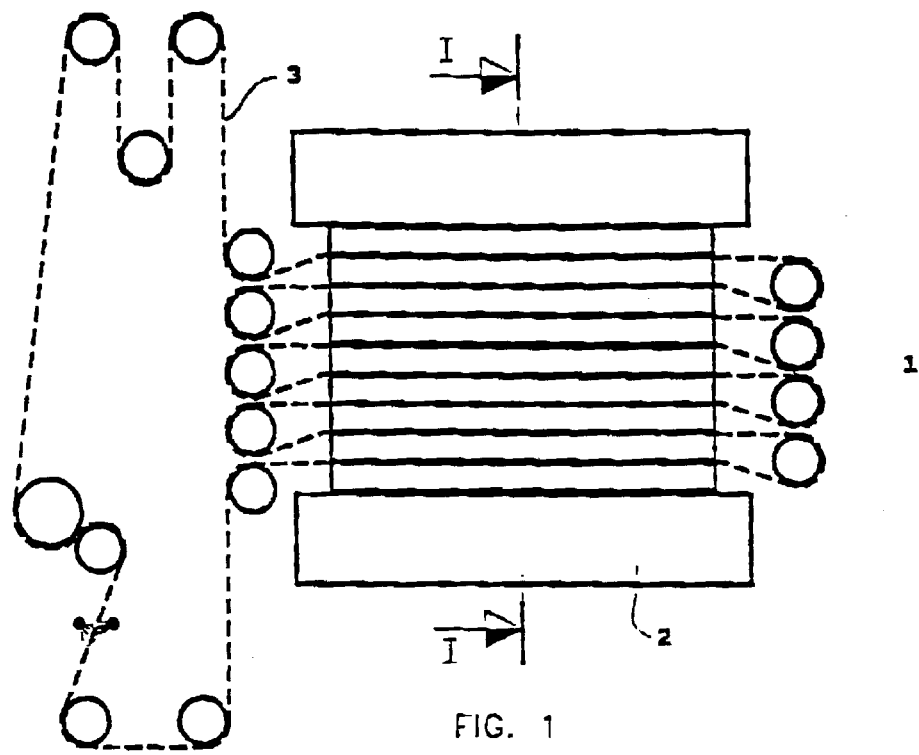
FIG. 1 is a side view of a filter press construction according to the invention with the filter plate pack closed for the filtration step.
Figure 2:
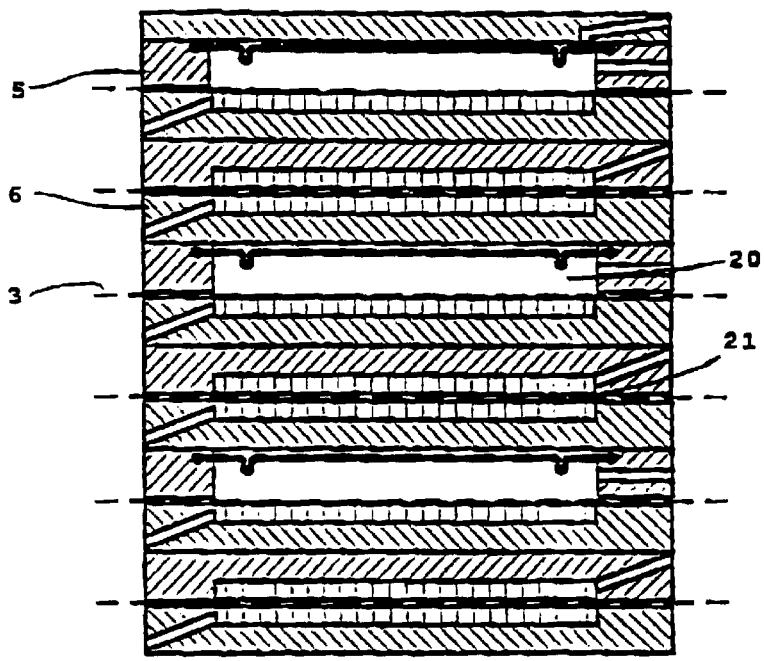
FIG. 2 is a cross-sectional side view along the plane I—I of the construction shown in FIG. 1.

Referring to FIGS. 1 and 2, the filter plate pack 1 of a filter press according to the invention is shown therein closed between compressive end plates 2. An endless filter fabric belt 3 is adapted to pass through each interplate gap and over a conveyor means 4.

The filter plate pack 1 is most advantageously comprised of a pack of alternatingly stacked filter cell plates 5 and washing cell plates 6 with a filter fabric 3 adapted to pass through each interplate gap. At the end of the shifting step the filter fabric belt is stopped so that the filter cake formation areas of the previous filtration step will always during the next step remain coincident with the washing cell plates 6. Correspondingly, the areas of the fabric belt washed during the previous filtration step will be stopped coincident with the filter cell plates 5.

The filter cell plate 5 comprises a frame 7 and a bottom plate 9 between which an elastic compression membrane 9 is clamped at its edges. The frame 7 is provided with a feed opening 10 via which the slurry is fed into the filter cell 20. The upper surface of the bottom plate 8 is provided with a grating 11, grooved pattern or similar structure that facilitates liquid flow through the filter fabric 3 and further along the upper surface of the plate via a discharge opening 12 out from the filter plate pack 1. Additionally, the filter plate 5 is provided with a connection 13 through which a pressurized medium (e.g., water or air) can be applied to the space above the membrane 9 during the membrane compression step for mechanically compressing the filter cake.

To the upper surface of the washing cell plate 6 that forms a washing cell 21 is adapted a grating 14 through which the liquid flow passed through the filter fabric 3 can discharge via the opening 15 out from the filter plate pack 1. The lower surface of the washing cell plate 6 is provided with a grooved pattern, a grating or similar recessed structure 16 suited to pass the washing fluid admitted via the opening 17 over the entire area of the recessed area 16 of the washing cell plate 6. The recessed area 16 may be arranged slightly higher than the rims of the lower surface of the washing cell plate 6 to permit unhindered flow of the washing fluid.

Figure 3:
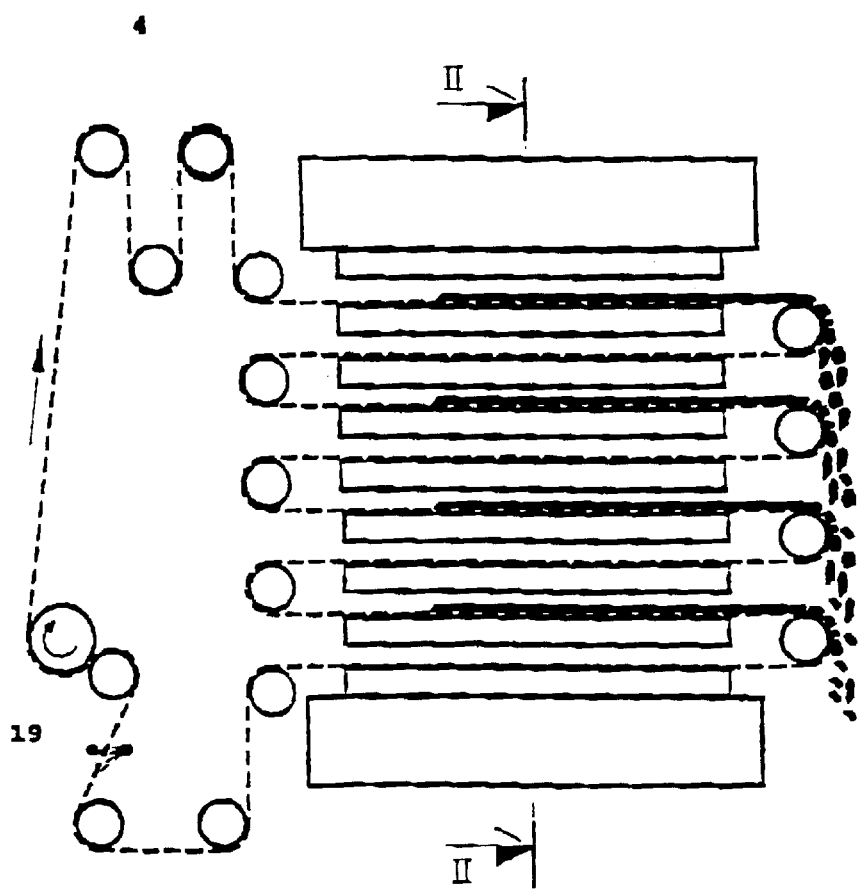
FIG. 3 is a side view of the same filter press opened for cake discharge.

In the situation shown in FIGS. 1 and 3, the filtration step is commenced with the pumping of the slurry, whereby the slurry to be filtered is fed by pumping via the feed opening 10 into the filter cell 20 formed by the filter plate. Here, the solids suspended in the slurry remain on the surface of the filter fabric 3 while the filtrate is drained through the filter fabric 3 and further via the washing cell space 14 provided by the recessed structure and the discharge opening 15 out from the filter plate pack 1.

Simultaneously with the pumping step of the slurry, the washing step of the filter fabric area 3 soiled during the previous filtration step can be carried out with the help of the washing cell plate 6 by applying washing fluid via the opening 17 and the recessed structure 16 to the surface of the filter fabric 3. The washing fluid counterflows through the fabric thereby backwashing the solids lodged in the weave of the fabric during the previous filtration stop and carrying the solids particles further via a grating 11 and the discharge opening 12 out from the filter plate pack 1. The washing fluid is most advantageously arranged to flow as by gravity, whereby the washing fluid passes through the fabric countercurrently to the filtrate flow direction in the previous filtration stop thus giving maximum cleaning effect.

The slurry pumping stop is followed by a membrane compression step during which the compressing medium is applied via the connection 13 behind the elastic membrane 9. Then, the membrane 9 flexed by the compressing medium compresses the filter cake thus reducing its moisture content. During a subsequent dewatering stop the pressure of the membrane compressing medium is released and compressed gas (typically air) is blown via the opening 10 through the filter cake for further reduction of its moisture content. Subsequent to the membrane compression step, the filter cake may also be subjected to a washing step in which filter cake is washed with a suitable washing fluid for diffusion displacement of mother liquid residues from the filter cake, after which a new membrane compression step can be applied to the cake.

The steps of a full filtration sequence may be repeated as many times or even partially as is conventional in the operation of this filter press type.

During all the above-described steps, the filter fabric may be washed with the help of the washing cell plates 6. The washing can be arranged either partially or entirely as a backwash in which the washing fluid flows through the filter fabric 3. Additionally, such an arrangement according to the invention makes it possible to implement dissolving washing, whereby the interior of the washing cell plate is filled with a washing fluid capable of dissolving solids plugging the weave of the fabric. Such dissolving washing can be implemented, e.g., by closing the opening 12 with the help of a valve adapted thereto when the washing cell is full of the washing fluid.

Prior to the opening step of the filter plate pack 1, the washing fluid may be removed from the washing cell by, e.g., blowing compressed air via the opening 17 into the washing cell, whereby the washing fluid is discharged via the opening 12.

Figure 4:
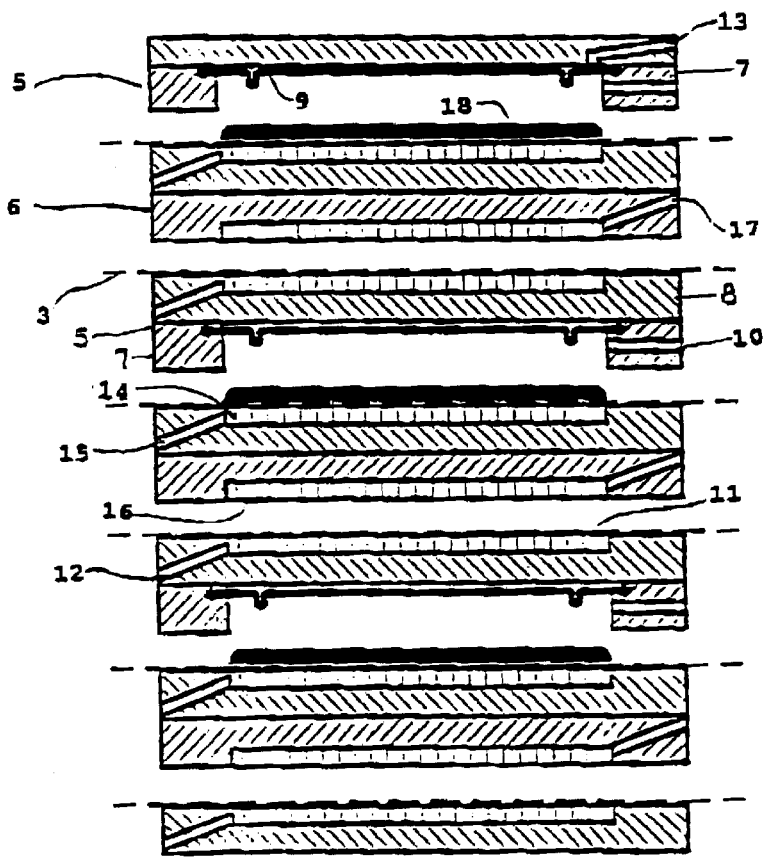
FIG. 4 is a cross-sectional side view along the plane II—II of the construction in FIG. 3.

Now referring to FIGS. 3 and 4, the filter plate pack 1 is opened after the completion of the filtration steps by moving the compressive end plates 2 at a greater distance from each other, whereby the plates of the pack 1 will be separated at a distance from each other remaining hanging on their hanging lugs or similar supports (not shown).

The filter fabric belt moved by the conveyor means 4 discharges the filter cakes 18 formed in the filter cells 5 to one side of the filter plate pack 1 only in accordance with the operating arrangement disclosed in the present invention.

The filter fabric belt 3 need be moved only for such a length that brings the fabric areas an which the filter cakes are formed in the filter cell 5 to coincide with the cell area of the washing plates 6. Obviously, it is also possible to shift the filter fabric belt 3 over one or more washing plates 6, e.g., in cases where the solids adhering to the surface of the filter fabric need be removed with maximum efficiency prior to the washing step using scrapers, for instance. Obviously, during the movement of the filter fabric belt 3 it may be additionally washed using conventional washing methods such as high-pressure water sprays 19 adapted to both sides of the fabric.

After the completion of the cake discharge step, the movement of the filter fabric belt 3 is stopped and the filter plate pack 1 is again closed pressure-tightly between the compressive end plates 2, whereby a new filtration sequence can be started.

To a person versed in the art, it is obvious that construction according to the invention is not limited to the above-described exemplifying embodiment, but rather, may be varied within the scope and spirit of the annexed claims. Hence, the invention is also applicable to other similar filter types having the filter plates aligned vertically instead of the horizontal alignment of the plates used in the above-described exemplifying embodiment. Further, the number of the filter plates and filter fabric belts is not limited by any means, but rather, the operating principle according to the invention can be implemented by adapting, e.g., a plurality of filter fabric belts to be moved separately looping about each washing plate.

Moreover, the application method and composition of the washing fluid are not limited by any means. Hence, the backwash and dissolving washing steps can be used in any desired combination and the use of multiple types of washing fluids if necessary is entirely compatible with the operating principle of the invention. Further, no limitations are set for the flow direction of the washing fluid.

For instance, the washing step can be carried out during the membrane compression step using the same liquid and pump with the membrane compression step. The losses of the compression fluid caused by the washing step use can be compensated for by replenishment with fresh fluid, whereby the heating of circulated compression fluid remains smaller in filter presses operated at elevated temperatures.

Obviously, the structure of the filter and washing plates can be varied within the scope of the annexed claims from the simplified embodiments illustrated in the drawings.

What is claimed is:

1. A method of washing a filter fabric of a filter press which includes at least two filtering means and at least two washing means, at least one of said washing means being positioned between adjacent filtering means, said method comprising the steps of:

(a) simultaneously, positioning a first portion of said filter fabric in a first filtering means for filtering in a filtration step a material to be filtered containing a liquid and solids through said first portion to form a first filter cake;

positioning a second portion of said filter fabric in a first washing means for washing said second portion;

positioning a third portion of said filter fabric in a second filtering means for filtering in a filtration step a material to be filtered containing a liquid and solids through said second portion to form a second filter cake; and positioning a fourth portion of said filter fabric in a second washing means for washing said second portion;

(b) filtering a portion of said material to be filtered in said first and second filtering means, thereby retaining the solids on a surface of the first and third portions of said filter fabric thereby forming said first and second filter cakes while said liquid is drained as a filtrate through the first and third portions of said filter fabric and removed from said first and second filtering means, and simultaneously washing said second and fourth portions of said filter fabric in said first and second washing means;

(c) following step (b), moving said filter fabric to discharge the first and second filter cakes from above the first and third portions of said filter fabric to one side of the filter press only and to thereafter position said first portion of said filter fabric in said first washing means, said second portion of said filter fabric in said second filtering means and said third portion of said filter fabric in said second washing means; and (d) filtering a further portion of said material to be filtered in said first and second filtering means, thereby forming additional filter cakes while said liquid is drained as a filtrate through portions of said filter fabric and removed from said first and second filtering means, and simultaneously washing said first and third portions of said filter fabric in said first and second washing means.

2. A method as defined in claim 1, wherein the filter fabric (3) is conveyed as an endless belt.

3. A method as defined in claim 2, wherein on each portion of the filter fabric (3) the following steps are performed sequentially: filtration step, cake formation step and fabric washing step serving to wash the area of the filter fabric (3) that is soiled during the previous filtration step.

4. A method as defined in claim 2, wherein the area of the filter fabric (3) soiled during the filtration step and cake discharge step is taken to the fabric washing step which is repeated as required at least once by either repeating the completed washing step or taking the filter fabric area to a new washing step.

5. A method as defined in claim 2, wherein the filter fabric (3) is taken into said washing means (21) into which a washing fluid or similar washing medium is passed for the purpose of washing the area of the filter fabric (3) soiled during the previous filtration step, whereby the washing fluid is arranged to flow countercurrently to the flow direction of the filtrate during the previous filtration step.

6. A method as defined in claim 1, wherein on each portion of the filter fabric (3) the following steps are performed sequentially: filtration step, cake formation step and fabric washing step serving to wash the area of the filter fabric (3) that is soiled during the previous filtration step.

7. A method as defined in claim 6, wherein the area of the filter fabric (3) soiled during the filtration step and cake discharge step is taken to the fabric washing step which is repeated as required at least once by either repeating the completed washing step or taking the filter fabric area to a new washing step.

8. A method as defined in claim 6, wherein the filter fabric (3) is taken into said washing means (21) into which a washing fluid or similar washing medium is passed for the purpose of washing the area of the filter fabric (3) soiled during the previous filtration step, whereby the washing fluid is arranged to flow countercurrently to the flow direction of the filtrate during the previous filtration step.

9. A method as defined in claim 1, wherein the area of the filter fabric (3) soiled during the filtration step and cake discharge step is taken to the fabric washing step which is repeated as required at least once by either repeating the completed washing step or taking the filter fabric area to a new washing step.

10. A method as defined in claim 9, wherein the filter fabric (3) is taken into said washing means (21) into which a washing fluid or similar washing medium is passed for the purpose of washing the area of the filter fabric (3) soiled during the previous filtration step, whereby the washing fluid is arranged to flow countercurrently to the flow direction of the filtrate during the previous filtration step.

11. A method as defined in claim 1, wherein the filter fabric (3) is taken into said washing means (21) into which a washing fluid or similar washing medium is passed for the purpose of washing the area of the filter fabric (3) soiled during the previous filtration step, whereby the washing fluid is arranged to flow countercurrently to the flow direction of the filtrate during the previous filtration step.

12. A filter press comprising
- at least one filter cell (20) for filtering a material to be filtered which contains a liquid and solids,
- a filter fabric (3) through which said material to be filtered is filtered in said at least one filter cell (20), and
- at least one washing cell (20) for washing an area of a filter fabric (3) after it has been soiled during filtration in said at least one filter cell (20); said at least one filter cell (20) being formed by a filter plate (5), said filter fabric (3) and an elastic membrane (9) arranged to compress the material to be filtered so as to drain a filtrate separated from said material through said filter fabric (3) while the solids remain as a filter cake (18) on the filter fabric (3), the filter plate (5) being formed of a frame (7) and a bottom plate (8);
- said at least one washing cell (21) being arranged to form, together with said at least one filter cell (20), a filter plate pack (1) and to receive a portion of said filter fabric (3) that has been soiled during filtration in said at least one filter cell (20) and including means to wash said soiled portion of said filter fabric (3); and
- said filter fabric (3) being adapted to pass through said at least one filter cell (20) and said at least one washing cell (21) so as to permit the discharge of the filter cake (18) formed on the filter fabric (3) to one side only of the filter pack (1).

13. A filter press as defined in claim 12, wherein said at least one filter cell (20) and said at least one washing cell (21) are stacked alternatingly so as to form said filter plate stack (1).

14. A filter press as defined in claim 12, wherein a number of the washing cells (21) in the filter press is 1–12.

15. A filter press as defined in claim 12, wherein the washing cell (21) is limited from its one side by the filter fabric (3) supported by an essentially open planar surface (11), while on its other side the washing cell is limited by a solid wall or a planar structure (16).

16. A filter press as defined in claim 12, wherein a number of the washing cells (21) in the filter press is 4–10.

* * * * *